Nov. 19, 1935.  E. F. POLAND  2,021,377
REVERSIBLE DRIVE
Filed April 4, 1934  2 Sheets-Sheet 1
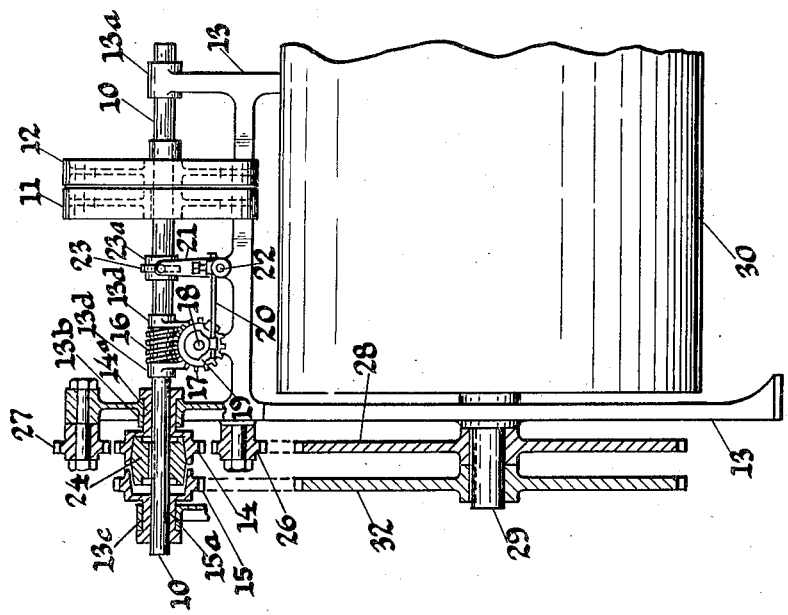
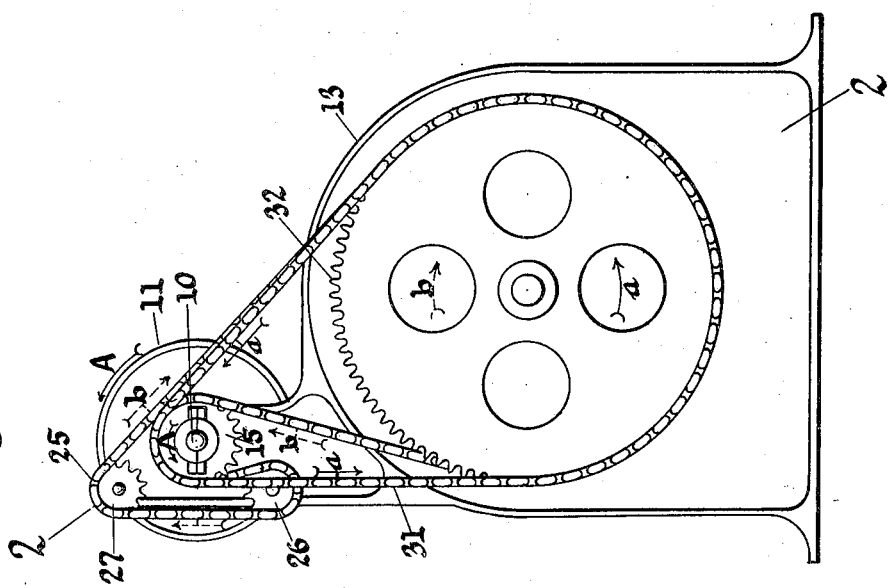
Inventor.
Edward F. Poland.
By Ernest R. Llewellyn.
Attorney.

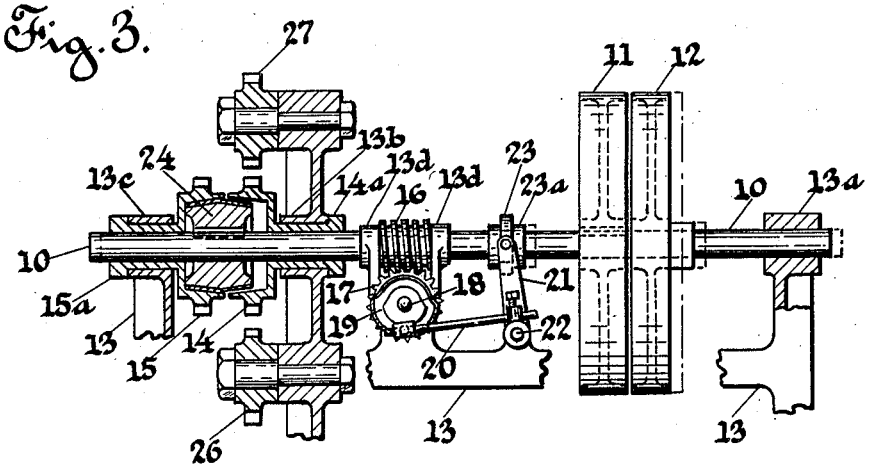
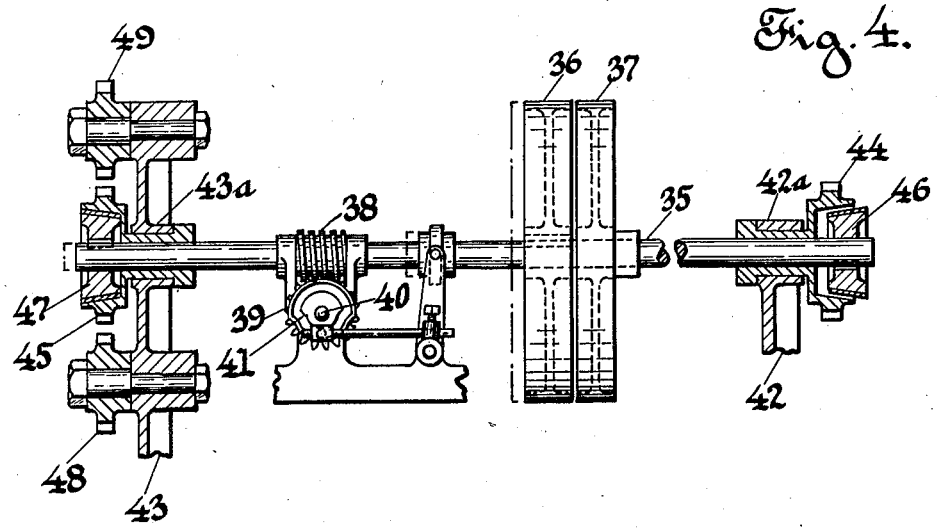

Patented Nov. 19, 1935

2,021,377

UNITED STATES PATENT OFFICE 2,021,377

REVERSIBLE DRIVE

Edward F. Poland, West Roxbury, Mass., assignor of one-third to Ida C. Poland and one-third to Laurence E. Poland, both of West Roxbury, Mass., and one-third to Everett F. Poland, Needham, Mass.

Application April 4, 1934, Serial No. 718,918

3 Claims. (Cl. 74—324)

This invention relates to mechanical drives and more particularly to an automatic reversing drive wherein the main driving unit is continuously rotated in a given direction and the direction of rotation of the driven member periodically reversed.

Drives of the above character usually comprise a series of pulleys, one being driven by a straight belt, to function in one direction of rotation, and a second pulley, driven by a crossed belt, to give a converse direction of rotation, with a sliding clutch disposed between the pulleys for the purpose of engaging and driving the desired pulley or belt shifting means disposed between the prime mover and the pulleys as is well known in the art. Drives of this type require a series of drive shafts and counter-shafts to support the pulleys and require considerable space to accommodate a proper installation.

The object of my present invention is to provide a reversible type drive of a simplified and efficient construction having operating mechanism removed from the lower portion of the mechanism near the floor, and positioned above the member to which the periodic change of rotation is to be imparted, thus economizing in space and rendering the mechanism less dangerous to the operator, and that may be embodied, as a unit, with the apparatus to be driven and wherein the apparatus may be driven in converse directions for a predetermined period.

With the above and other objects in view my invention comprises a novel combination and arrangement of parts hereinafter described and more specifically pointed out in the appended claims.

In the accompanying drawings I have shown my drive sufficient to enable those skilled in the art to understand the construction and operation. While I have shown my drive as associated with a rotary washing machine, it is to be understood as for the purpose of illustration and the drive unit is not limited thereto.

Referring to the drawings:—

Fig. 1 is an end view of a rotary washing machine having my reversible drive embodied therewith.

Fig. 2 is a transverse section taken substantially along line 2—2, Fig. 1.

Fig. 3 is a front view of my drive elements, in this view a portion of the supporting frame and some of the elements are shown in section.

Fig. 4 is a view corresponding substantially to Fig. 3 but shows a modification of some of the elements.

As illustrated in the drawings, the shaft 10 is rotated, by means of any of the usual and well known connections, from the prime mover (not shown), which in this instance comprises a pulley 11, secured to the shaft, and a belt (not shown) from the prime mover. The shaft 10 also has a pulley 12 freely rotatable thereon and to which the driving belt may be shifted when it is desired to have the shaft 10 remain inactive. One end of said shaft 10 is rotatably and slidably mounted in a suitable bearing 13a of the supporting frame 13, the opposed end portion of said shaft being rotatably and slidably mounted in the hubs 14a, 15a of opposed sprockets 14, 15, said hubs 14a, 15a being rotatably supported in suitable bearings 13b, 13c of the frame 13.

Slidably keyed to the shaft 10 is a worm 16 which meshes with and rotates a worm gear 17 secured to a shaft 18 rotatably mounted in suitable bearings of the frame 13. Said worm 16 is caused to rotate with the shaft 10 but is restrained from axial movement by means of opposed bearings 13d of the frame.

Secured to the shaft 18 is a track cam 19 which engages a cam roll secured to one end of a preferably resilient rod 20. The opposed end of said said rod 20 is secured in the hub portion of a vertically extending yoke lever 21, said lever being pivoted at 22 to the frame 13. The upper yoke portion of said lever 21 engages the yoke collar 23 rotatably supported in an annular recess in a hub member 23a secured to the shaft.

As the shaft 10 is rotated, the worm 16 is rotated therewith and through the worm gear 17 the cam 19 through its intermediate connections oscillates the yoke lever 21 and causes axial movement, from right to left, of the shaft. The period of dwell at the end of each movement being controlled by the proportions of the cam track. As illustrated the cam will cause converse movement of the shaft for each revolution of the cam.

As the shaft 10 is moved to the right, see Fig. 2, the clutch member 24, secured to the shaft, will engage the inner clutch face of the sprocket 14 and cause said sprocket to be rotated therewith. In this instance I have provided a continuous roller chain 25 which engages with the sprocket 14 and also with a pair of idler sprockets 26, 27 and a main sprocket 28 secured to a shaft 29, rotatably mounted in suitable bearings of the frame 13, which has secured thereto and rotates the washing machine drum 30.

With the pulley 11 and shaft 10 rotating contra-clockwise, as indicated by arrows a, the chain 25 by means of engaging the idle sprockets 26, 27 will cause the sprocket 28 and drum 30 to be rotated in a clockwise direction as indicated by arrows b. The spocket 15, being freely rotatable on the shaft, will have no driving relation while the sprocket 14 is in driving engagement.

As the shaft 10 is moved to the left, from its right hand position, see Fig. 3, as indicated by broken lines, the cam member 24 will engage the internal cam face of the sprocket 15 and thus cause said sprocket to be rotated in relation to said shaft. The continuous roller chain 31 engages the sprocket 15 and drives the main sprocket 32 secured to the shaft 29. When the sprocket 15 is in driving engagement with the shaft, which is continuously rotated in a contra-clockwise direction, the sprocket 32 and drum 30 will be rotated in a like direction as indicated by arrows a.

At Fig. 4 I have shown a modified form of my reversible drive. In this modification the shaft 35 is provided with a pulley 36 secured to the shaft and a loose pulley 37 freely rotatable thereon. The worm 38, slidably keyed to the shaft, engages and drives the worm gear 39 secured to a shaft 40 which also has secured thereto the cam 41 which actuated the shaft 35 as above described.

At Fig. 2 I have illustrated one end of my drum and frame but it is to be understood that the drum is provided with opposed end frames, a portion of said opposed frames 42, 43 being shown at Fig. 4.

The opposed ends of the shaft 35 are rotatably and slidably mounted in the hub portion of opposed clutch sprockets 44, 45, said hubs being rotatably supported in suitable bearings 42a, 43a of the end frames.

Secured to the opposed end of the shaft 35 are the opposed clutch members 46, 47.

When the shaft is moved to the right, the clutch member engages and drives the sprocket 45 which, through an endless roller chain 25, as shown at Fig. 1, will engage the idler sprockets 48, 49, and drive the main sprocket 28 as above described.

When the shaft is moved to the left, the clutch element 46 will engage and drive the sprocket 44. In this modified arrangement the main sprocket, as indicated at 32, Fig. 2, would be positioned adjacent the opposed end frame 42, and the continuous roller chain 31 would engage with the sprocket 44 and main sprocket 32 for function as above described in a contra-clockwise direction.

While I have illustrated a selected embodiment of my invention I do not wish to be limited to the constructional features shown and what I claim is:—

1. A reversible drive for driving a rotatable member alternately in opposite directions comprising a driven axially movable shaft, bearings for said shaft, means on said shaft and above the rotatable member, and operably independent of said member and actuated by said driven shaft for axially shifting said shaft to opposed positions, opposed clutch members freely rotatable relative to said shaft, a clutch member secured to said shaft and adapted for alternate engagement with said opposed clutch members; a rotatable member having a pair of driving members thereon, independent means engaging each of said driving members and said clutch members with interposed means whereby one of said engaging means will cause said rotatable member to be rotated in a direction contrawise to said driven shaft and whereby one of said engaging means will cause said rotatable member to be rotated in the direction of said driven shaft.

2. In a drive comprising a driven shaft and a member to be alternately rotated, means on said shaft and above the member to be alternately rotated and operatively independent of the same, embodied with and actuated by said driven shaft for axially moving said shaft, opposed clutch members positioned on said shaft and freely rotatable relative thereto, a clutch element secured to said shaft and adapted for alternate engagement with said opposed clutch members when said shaft is axially positioned relative thereto, connecting means between each of said clutch members and said first member whereby when one of said clutch members is in driving relation to said driven shaft, said first member will be rotated in a direction corresponding thereto, with means whereby, when the opposed clutch member is in driving relation to said driven shaft, said first member will be rotated in a direction opposite to said first shaft.

3. In a drive comprising a shaft driven always in one direction and a member to be alternately rotated, a support for said member, means above said alternately rotatable member comprising a worm on the driven shaft, a collar on the shaft, a worm gear mounted on the support for the rotatable member but above said member and meshing with the worm, a cam operatively connected with said worm gear, a yoke mounted on said support and engaging said collar, a rod with a roll thereon connecting said yoke with said cam for axially moving said driven shaft; opposed clutch members positioned on said shaft and freely rotatable relative thereto, a clutch element secured to said shaft and adapted for alternate engagement with said opposed clutch members when said shaft is properly axially positioned relative thereto; connecting means between each of said clutch members and said rotatable member whereby when one of said clutch members is in driving relation to said driven shaft, said rotatable member will be rotated in a direction corresponding thereto, with means whereby, when the opposed clutch member is in driving relation to said driven shaft, said rotatable member will be rotated in a direction opposite to said driven shaft.

EDWARD F. POLAND.